United States Patent [19]

Iwasaki et al.

[11] Patent Number: 6,066,922
[45] Date of Patent: May 23, 2000

[54] ELECTRON EMISSION DEVICE AND DISPLAY DEVICE USING THE SAME

[75] Inventors: Shingo Iwasaki; Kiyohide Ogasawara; Takamasa Yoshikawa; Takashi Chuman; Nobuyasu Negishi; Hiroshi Ito; Atsushi Yoshizawa; Takashi Yamada; Shuuichi Yanagisawa; Kazuto Sakemura, all of Tsurugashima, Japan

[73] Assignee: Pioneer Electronic Corporation, Tokyo, Japan

[21] Appl. No.: 09/131,222

[22] Filed: Aug. 7, 1998

[30] Foreign Application Priority Data

Aug. 8, 1997 [JP] Japan ................................. 9-215137

[51] Int. Cl.[7] ........................................................ G09G 3/10
[52] U.S. Cl. .................. 315/169.3; 315/315; 315/169.1; 313/310
[58] Field of Search ............................ 315/169.3, 169.1, 315/169.2, 169.4; 313/586, 587, 581, 582, 495, 306, 310

[56] References Cited

U.S. PATENT DOCUMENTS

| | | |
|---|---|---|
| 3,445,281 | 5/1969 | Sullivan ................................. 117/217 |
| 3,830,648 | 8/1974 | Rutherford et al. ...................... 96/1.5 |
| 4,731,560 | 3/1988 | Ernsthausen ............................. 313/587 |
| 5,386,172 | 1/1995 | Komatsu ................................ 313/309 |
| 5,894,189 | 4/1999 | Ogasawara et al. ..................... 313/310 |
| 5,936,257 | 8/1999 | Kusunoki et al. ........................ 257/10 |
| 5,945,777 | 8/1999 | Janning et al. ......................... 313/310 |
| 5,949,185 | 9/1999 | Janning ................................. 313/495 |
| 5,962,959 | 10/1999 | Iwasaki et al. ......................... 313/310 |
| 5,986,390 | 10/1999 | Chuman et al. ......................... 313/310 |
| 5,990,605 | 10/1999 | Yoshikawa et al. ..................... 313/310 |

FOREIGN PATENT DOCUMENTS

| | | |
|---|---|---|
| 0 797 233 | 9/1997 | European Pat. Off. . |
| 0 798 761 | 10/1997 | European Pat. Off. . |
| 2 675 306 | 10/1992 | France . |

*Primary Examiner*—Don Wong
*Assistant Examiner*—Tuyet T. Vo
*Attorney, Agent, or Firm*—Morgan, Lewis & Bockius LLP

[57] ABSTRACT

An electron emission device exhibits a high electron emission efficiency. The device includes an electron-supply layer of metal or semiconductor, an insulator layer formed on the electron-supply layer, and a thin-film metal electrode formed on the insulator layer. The insulator layer has at a film thickness of 50 nm or greater and a field-stabilizing layer. When an electric field is applied between the electron-supply layer and the thin-film metal electrode, the electron emission device emits electrons.

14 Claims, 8 Drawing Sheets

ELECTRON EMISSION DEVICE AND DISPLAY DEVICE USING THE SAME

BACKGROUND OF THE INVENTION

1. Field of the invention

The present invention relates to an electron emission device and an electron emission display device using the same.

2. Description of the related art

In field electron emission display apparatuses, a Field Emission Display (FED) is known as a planar emission display device equipped with an array of cold-cathode electron emission source which does not require cathode heating. The emission principle of, for example, an FED using Spindt-type cold cathodes of minute protrusions is as follows: Its emission principle is like a Cathode Ray Tube (CRT), although this FED has a cathode array of Spindt-type protrusions which is different from that of CRT. In the FED, electrons are drawn into a vacuum space by means of each gate electrode spaced apart from the Spindt-type cathode, and the electrons are made to impinge upon the fluorescent substance that is coated on a transparent anode, thereby causing light emission.

This FED, however, has a problem of low production yield because the manufacture of the minute Spindt-type emitter arrays as a cold cathode is complex and involves many processes.

There also exists an electron emission device with a metal-insulator-metal (MIM) structure as a planar electron emission source. The electron emission device with the MIM structure comprises an Al underlayer as a base electrode, an $Al_2O_3$ insulator layer with about 10 nm thickness, and an Au overlayer, as a top electrode with about 10 nm thickness which are formed in order on the substrate. In the case that this MIM device is placed under an opposing electrode in a vacuum, when a voltage is applied between the Al underlayer and the Au overlayer and, at the same time, an acceleration voltage is applied to the opposing electrode, then some of electrons emit out of the Au overlayer and reach the opposing electrode. Even the electron emission device with the MIM structure does not yet provide a sufficient amount of emitted electrons.

To improve these disadvantages of emission of the MIM device, it is conventionally considered that there is a necessity to make the $Al_2O_3$ insulator layer thinner by about several nanometers and make the $Al_2O_3$ insulator layer with a uniform quality so that the interface between the $Al_2O_3$ insulator layer and the Au overlayer is more uniform.

To provide a thinner and more uniform insulator layer, for example, an attempt has been made to control the anodized current by using an anodization method thereby to improve the electron emission characteristics, as in the invention described in Japanese Patent Application kokai No. Hei 7-65710.

However, even an electron emission device with the MIM structure which is manufactured by this anodization method ensures an emission current of about $1 \times 10^{-5}$ A/cm$^2$ and an electron emission efficiency of about $1 \times 10^{-3}$.

OBJECTS AND SUMMARY OF THE INVENTION

Accordingly, it is an object of the present invention to provide an electron emission device with a high electron emission efficiency capable of stably emitting electrons with a low applied voltage thereto and an electron emission display apparatus using the same.

In order to overcome the foregoing and other problems, the object of the invention are realized by an electron emission device in accordance with embodiments of this invention, wherein the device according to the invention comprises:

an electron-supply layer made of metal or semiconductor disposed on an ohmic electrode;

an insulator layer formed on the electron-supply layer; and a thin-film metal electrode formed on the insulator layer and facing a vacuum space, characterized in that said insulator layer has at least one field-stabilizing layer having a conductivity higher than that of said insulator layer, whereby the electron emission device emits electrons when an electric field is applied between the electron-supply layer and the thin-film metal.

In the electron emission device according to the invention, said field-stabilizing layer is disposed at an interface between the thin-film metal electrode and the insulator layer.

In the electron emission device according to the invention, said field-stabilizing layer is disposed at an interface between the insulator layer and the electron-supply layer.

In the electron emission device according to the invention, said field-stabilizing layer is disposed at an mediate region of said insulator layer.

In the electron emission device according to the invention, a plurality of the field-stabilizing layer and the insulator layer are alternately layered by in the thickness direction.

In the electron emission device according to the invention, a plurality of said layered field-stabilizing layers have thicknesses gradually descended in the thickness direction.

In the electron emission device according to the invention, a plurality of said layered field-stabilizing layers have thicknesses gradually ascended in the thickness direction.

Moreover a display device using an electron emission device according to the invention comprises:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron-supply layer of metal or semiconductor; an insulator layer formed on the electron-supply layer; and a thin-film metal electrode formed on the insulator layer and facing a vacuum space, wherein said insulator layer has at least one field-stabilizing layer having a conductivity higher than that of said insulator layer.

In the electron emission display device according to the invention, said field-stabilizing layer is disposed at an interface between the thin-film metal electrode and the insulator layer.

In the electron emission display device according to the invention, said field-stabilizing layer is disposed at an interface between the insulator layer and the electron-supply layer.

In the electron emission display device according to the invention, said field-stabilizing layer is disposed at an mediate region of said insulator layer.

In the electron emission display device according to the invention, a plurality of the field-stabilizing layer and the insulator layer are alternately layered by in the thickness direction.

In the electron emission display device according to the invention, a plurality of said layered field-stabilizing layers have thicknesses gradually descended in the thickness direction.

In the electron emission display device according to the invention, a plurality of said layered field-stabilizing layers have thicknesses gradually ascended in the thickness direction.

According to the electron emission device of the invention with the above structure, the emission current of the device is stabilized by the field-stabilizing layer since the field-stabilizing layer averages the electric field in the insulator layer, even when any impurity and/or defect exists in the insulator layer. Therefore, when this electron emission device is used in a display device, it can provide a high luminance, and suppress the consumption of the drive current to reduce the generation of heat, and can reduce a load on the driving circuit for the device. Moreover, throughbores are not likely to be produced in the insulator layer because of its relatively thick thickness and therefore its production yield is improved.

The electron emission device of the invention is a planar or spot-like electron emission diode and can be adapted to high speed devices such as a source of a pixel vacuum tube or bulb, an electron emission source of a scanning or transmission electron microscope, a vacuum-micro electronics device and the like. In addition, this electron emission device can serve as a minute microwave tube or a diode which emits electromagnetic waves with millimeter or submillimeter wavelength, and also can serve as a high speed switching device.

DETAILED DESCRIPTION OF THE PREFERRED EMBODIMENTS

Preferred embodiments according to the present invention will be described in more detail with reference to the accompanying drawings.

The inventors have discovered that, when the electron emission device comprising the thin insulator layer is driven by an applied voltage, the electric field is disordered by impurities and/or defects existing in the insulator layer, so that this behavior makes the electron emission unstable. To solve this problem, the inventors reveal the insertion of a field-stabilizing layer or high conductance thin film for stabilizing the electric field between the insulator layer and the electron-supply layer, or between the thin-film metal electrode and the insulator layer, or between the insulator layers.

This high conductance thin-film for stabilizing the electric field i.e., field-stabilizing layer has a thickness ranging from 1 nm to 100 nm. The field-stabilizing layers are provided at one portion or more in the insulator layer, or the insulator layer may be divided into three portions between which the high conductance thin-films are inserted. Such a high conductance thin-film has a conductivity higher than that of the insulator layer such as silicon oxide $SiO_x$ wherein subscribed x represents an atomic ratio.

Figure 1:
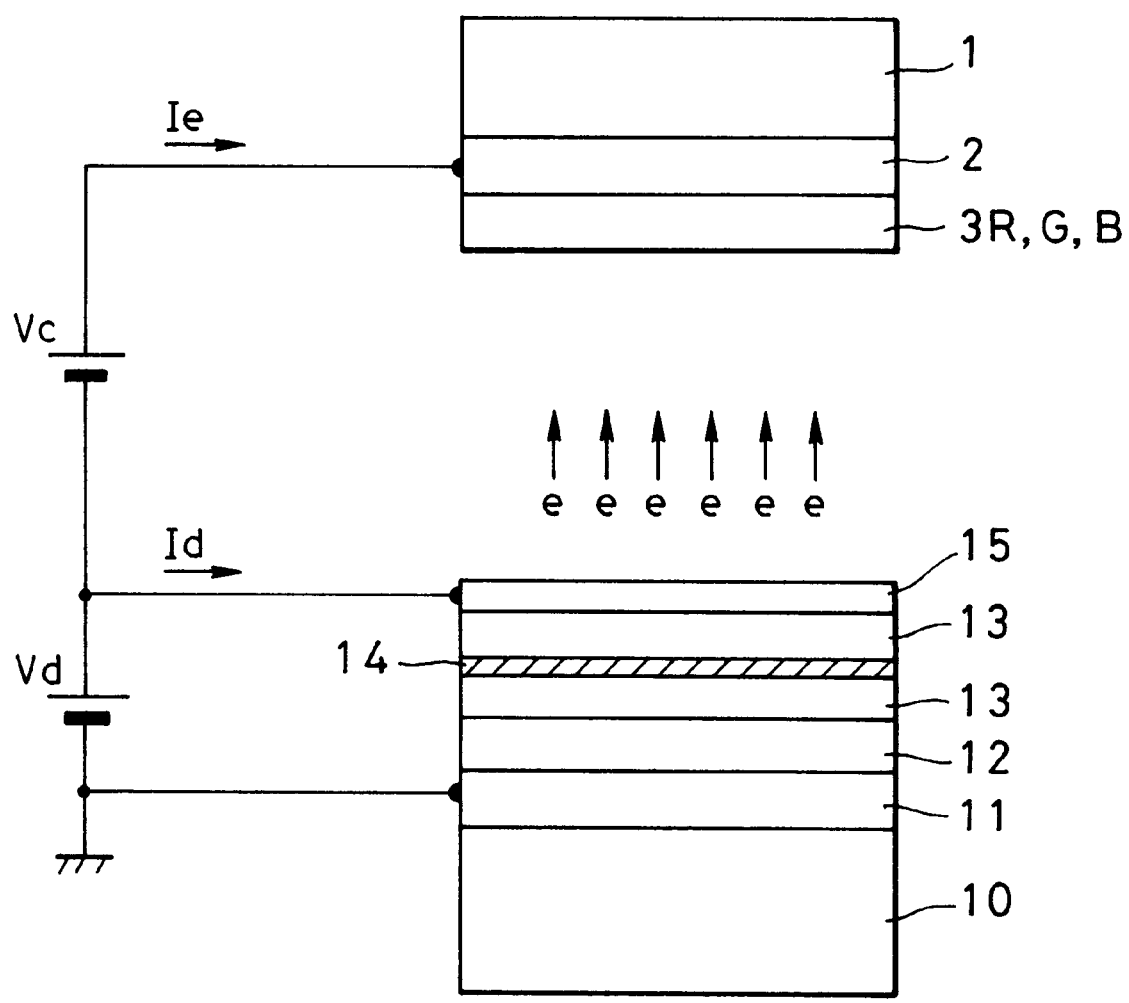
FIG. 1 is a schematic cross-sectional view of an electron emission device according to the invention.

As shown in FIG. 1, an electron emission device embodying the invention has an electron-supply layer 12 of silicon (Si), an insulator layer 13 of silicon dioxide ($SiO_2$) and a thin-film metal electrode 15 of gold (Au) facing a vacuum space which are layered or formed in turn on an electrode surface of a device substrate 10 of glass on which an ohmic electrode 11 of tungsten (W) is previously formed. Particularly, in the electron-supply layer 12, a field-stabilizing layer 14 made of a high conductance metal such as Al, W is disposed at an mediate region thereof. A second substrate 1 is fixed to the first substrate 10 so as to sandwich a vacuum space therebetween. Transparent collector electrodes 2 and fluorescent substances corresponding to red (R), green (G) and blue (B) color emissions are provided in the internal surface of the second substrate 1.

The insulator layer 13 is deposited in relatively thicker thicknesses so as to have a thickness of 50 nm or greater. This electron emission device can be regarded as a diode of which the thin-film metal electrode 15 at its surface is connected to a positive applied voltage Vd and the back i.e., ohmic electrode 11 is connected to a ground potential. When the voltage Vd e.g., 90V is applied between the ohmic electrode 11 and the thin-film metal electrode 15 to supply electrons into the electron-supply layer 12, a diode current Id flows. Since the insulator layer 13 has a high resistance, most of the applied electric field is applied to the insulator layer 13. The electrons travel in the conduction band in the insulator layer 13 toward the thin-film metal electrode 15. Some of the electrons that reach near the thin-film metal electrode 15 tunnel through the thin-film metal electrode 15, due to the strong electric field, to be emitted out into the vacuum space.

The electrons e (emission current Ie) discharged from the thin-film metal electrode 15 by the tunnel effect are soon accelerated by a high voltage Vc, which is applied to an opposing collector electrode (transparent electrode) 2, and is collected at the collector electrode 2. If a fluorescent substance is coated on the collector electrode 2, corresponding visible light is observed.

While Si is particularly effective as a material for the electron-supply layer 12 of the electron emission device, an elemental semiconductor or a compound semiconductor of an element of a group IV, a group III-V, a group II-VI or the like, such as a germanium (Ge), germanium silicon compound (Ge-Si), silicon carbide (SiC), gallium arsenide (GaAs), indium phosphide (InP), or cadmium selenide (CdSe) or $CuInTe_2$ can be used as well.

While metals such as Al, Au, Ag and Cu are effective as the electron supplying material, Sc, Ti, V, Cr, Mn, Fe, Co, Ni, Zn, Ga, Y, Zr, Nb, Mo, Tc, Ru, Rh, Pd, Cd, Ln, Sn, Ta, W, Re, Os, Ir, Pt, Tl, Pb, La, Ce, Pr, Nd, Pm, Sm, Eu, Gd, Tb, Dy, Ho, Er, Tm, Yb, Lu and the like can be used as well.

Silicon oxide $SiO_x$ (wherein subscribed x represents an atomic ratio) is effective as the dielectric material of the insulator layer 13 and, metal oxides or metal nitrides such as $LiO_x$, $LiN_x$, $NaO_x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $TiN_x$, $ZrO_x$, $ZrN_x$, $HfO_x$, $HfN_x$, $ThO_x$, $VO_x$, $VN_x$, $NbO_x$, $TaO_x$, $TaN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $SiN_x$, $GeO_x$, $SnO_x$, $PbO_x$, $PO_x$, $PN_x$, $AsO_x$, $SbO_x$, $SeO_x$, $TeO_x$ and the like can be used as well. Furthermore, metal complex oxides such as $LiAlO_2$, $Li_2SiO_3$, $Li_2TiO_3$, $Na_2Al_{22}O_{34}$, $NaFeO_2$, $Na_4SiO_4$, $K_2SiO_3Rb_2CrO_4$, $Cs_2CrO_4$, $MgAl_2O_4$, $MgFe_2O_4$, $MgTiO_3$, $CaTiO_3$, $CaWO_4$, $CaZrO_{SrFe12}O_{19}$, $SrTiO_3$, $SrZrO_3$, $BaAl_2O_4$, $BaFe_{12}O_{19}$, $BaTiO_3$, $Y_3A_5Y_3Fe_5O_{12}$, $LaFeO_3$, $La_3Fe_5O_{12}$, $La_2Ti_2O_7$, $CeSnO_4$, $CeTiO_4$, $Sm_3Fe$ $EuFeO_3$, $Eu_3Fe_5O_{12}$, $GdFeO_3$, $Gd_3Fe_5O_{12}$, $DyFeO_3$, $Dy_3Fe_5O_{12}HoFeO_3$ $Ho_3Fe_5O_{12}$, $ErFeO_3$, $Er_3Fe_5O_{12}$, $Tm_3Fe_5O_{12}$, $LuFeO_3$, $Lu_3Fe_{\ 5}O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_5$, $FeTiO_3$, $MgTiO_3$, $NaSiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2–Sb_2O_3$, $CuSeO_4$, $Na_2SeO_3$, $ZnSeO_3$, $K_2TeO_3$, $K_2TeO_4$, $Na_2TeO_3$, $Na_2TeO_4$ and the like can be used as well and still furthermore, sulfides such as FeS, $Al_2S_3$, MgS, ZnS and the like, fluorides such as LiF, $MgF_2$, $SmF_3$ and the like, chlorides such as HgCl, $FeCl_2$, $CrCl_3$ and the like, bromides such as AgBr, CuBr, $MnBr_2$ and the like, iodide such as $PbI_2$, CuI, $FeI_2$ and the like and metal oxidized nitrides such as SiAlON and the like can be used as well for the insulator layer.

Moreover, carbon such as diamond, Fullerene $(C_{2n})$ and the like or metal carbide such as $Al_4C_3$, $B_4C$, $CaC_2$, $Cr_3C_2$, $Mo_2C$, MoC, NbC, SiC, TaC, TiC, VC, $W_2C$, WC, ZrC and the like are also effective as the dielectric material of the insulator layer 13. Fullerene $(C_{2n})$ consists of carbon atoms. The representative $C_{60}$ is a spherical surface basket molecule as known a soccer ball molecule. There is also known $C_{32}$ to $C_{960}$ and the like. The subscribed x in $O_x$, $N_x$ and the like in the above chemical formulas represent atomic ratios and also herein after.

The film thickness of the insulator layer 13 may be 50 nm or greater preferably in ranging from 100 to 1000 nm.

Metals Pt, Au, W, Ru and Ir are effective as the material for the thin-film metal electrode 15 on the electron emission side. In addition, Al, Sc, Ti, V, Cr, Mn, Fe, Co, Ni, Cu, Zn, Ga, Y, Zr, Nb, Mo, Tc, Rh, Pd, Ag, Cd, Ln, Sn, Ta, Re, Os, Tl, Pb, La, Ce, Pr, Nd, Pm, Sm, Eu, Gd, Tb, Dy, Ho, Er, Tm, Yb, Lu and the like can be used as well for the thin-film metal electrode.

The field-stabilizing layer 14 of high conductance film in the insulator layer 13 is made of a substance selected from materials having an electric resistivity lower than that of the insulator layer 13 such as Li, Be, C, Na, Mg, Al, Si, K, Ca, Sc, Ti, V, Cr, Mn, Fe, Co, Ni, Cu, Zn, Ga, Ge, As, Rb, Sr, Y, Zr, Nb, Mo, Ru, Rh, Pd, Ag, Cd, In, Sn, Sb, Te, Cs, Ba, Hf, Ta, W, Re, Os, Ir, Pt, Au, Hg, Tl, Pb, Bi, Po, La, Ce, Pr, Nd, Sm, Eu, Gd, Tb, Dy, Ho, Er, Tm, Yb, Lu and the like or metal or semiconductor or oxide thereof.

Ceramics such as $Al_2O_3$, $Si_3N_4$ and BN etc. may be used for the material of the device substrate 10 instead of glass.

Although sputtering is particularly effective in the fabrication of those layers and the substrate, vacuum deposition, CVD (Chemical Vapor Deposition), laser ablation, MBE (Molecular Beam Epitaxy) and ion beam sputtering are also effective.

Electron emission devices according to the invention comprising electron-supply layers each having a field-stabilizing layer were fabricated as first embodiments and their characteristics were examined concretely.

First, as shown in FIG. 1, an electron-supply layer 12 of Si was deposited with thickness of 5 $\mu$m by sputtering, on an electrode surface 11 of each device substrate of glass on which an ohmic electrode 11 of 300 nm thick W was previously deposited by sputtering. A plurality of preliminary substrates of this type were similarly prepared.

Subsequently, an insulator layer 13 of $SiO_x$ was deposited with thickness of 195 nm on the electron-supply layer 12 per one of the preliminary substrates. Next a field-stabilizing layer 14 was deposited with thickness of 5 nm on each insulator layer 13. Then a $SiO_x$ insulator layer 13 with a $_{200}$ nm thick was deposited again on this field-stabilizing layer 14 per one preliminary substrate. In this way, the first embodiments of the devices were manufactured in which the field-stabilizing layer 14 was sandwiched between the two insulator layers 13 having a similar thickness. In these cases, plural preliminary substrates were manufactured in such a manner that the field-stabilizing layers 14 had thicknesses of 0 nm (comparative), 5 nm, 15 nm, 30 nm, 40 nm, and 50 nm respectively, while the total thickness of the insulator layers 13 and the field-stabilizing layer 14 was set to be 100 nm, 400 nm, and 800 nm. The comparative electron emission devices were deposited as the field-stabilizing layers 14 had a 0 nm thickness. Thus a plurality of second preliminary substrates were provided. Each layer was deposited by sputtering by using a gas of Ar, Kr or Xe or a mixture thereof, or a gas mixture essentially consisting of one of those rare gases with $O_2$, $N_2$ or the like mixed therein, under the sputtering conditions of a gas pressure of 0.1 to 100 mTorr, preferably 0.1 to 20 mTorr and the depositing rate of 0.1 to 1000 nm/min, preferably 0.5 to 100 nm/min. The sputtering device was controlled by properly altering the sputtering target and sputtering conditions in order to obtain a single layer or multilayer structure, the amorphous or crystal phase, the grain size and the atomic ratio of the goal insulator layer 13.

The analysis on the SiOX insulator layer in this embodiment by using an X-ray diffraction was performed and then the result showed some halo intensity Ia caused by the amorphous phase. It can be assumed from this result that $SiO_x$ of the insulator layer consists of an amorphous phase portion.

Finally, a thin-film metal electrode of 10 nm thick Pt was formed on the surface of the amorphous $SiO_x$ layer of each substrate by sputtering, thus providing plural device substrates.

Meanwhile, transparent substrates were prepared, each of which has an ITO collector electrode formed inside a transparent glass substrate and has a fluorescent layer of a fluorescent substance corresponding to R, G or B color emission formed on the collector electrode by the normal scheme.

Electron emission devices of the first embodiments were assembled in each of which the device substrate and the transparent substrate are supported apart from one another by 10 mm in parallel by a spacer in such a way that the thin-film metal electrode 15 faced the collector electrode 2, with the clearance therebetween made to a vacuum of $10^{-7}$ Torr or $10^{-5}$ Pa.

Then, the diode current Id and the emission current Ie of the plural devices were measured while a driving voltage Vd of 0 to 200 V was applied to the prepared electron emission devices.

Figure 2:
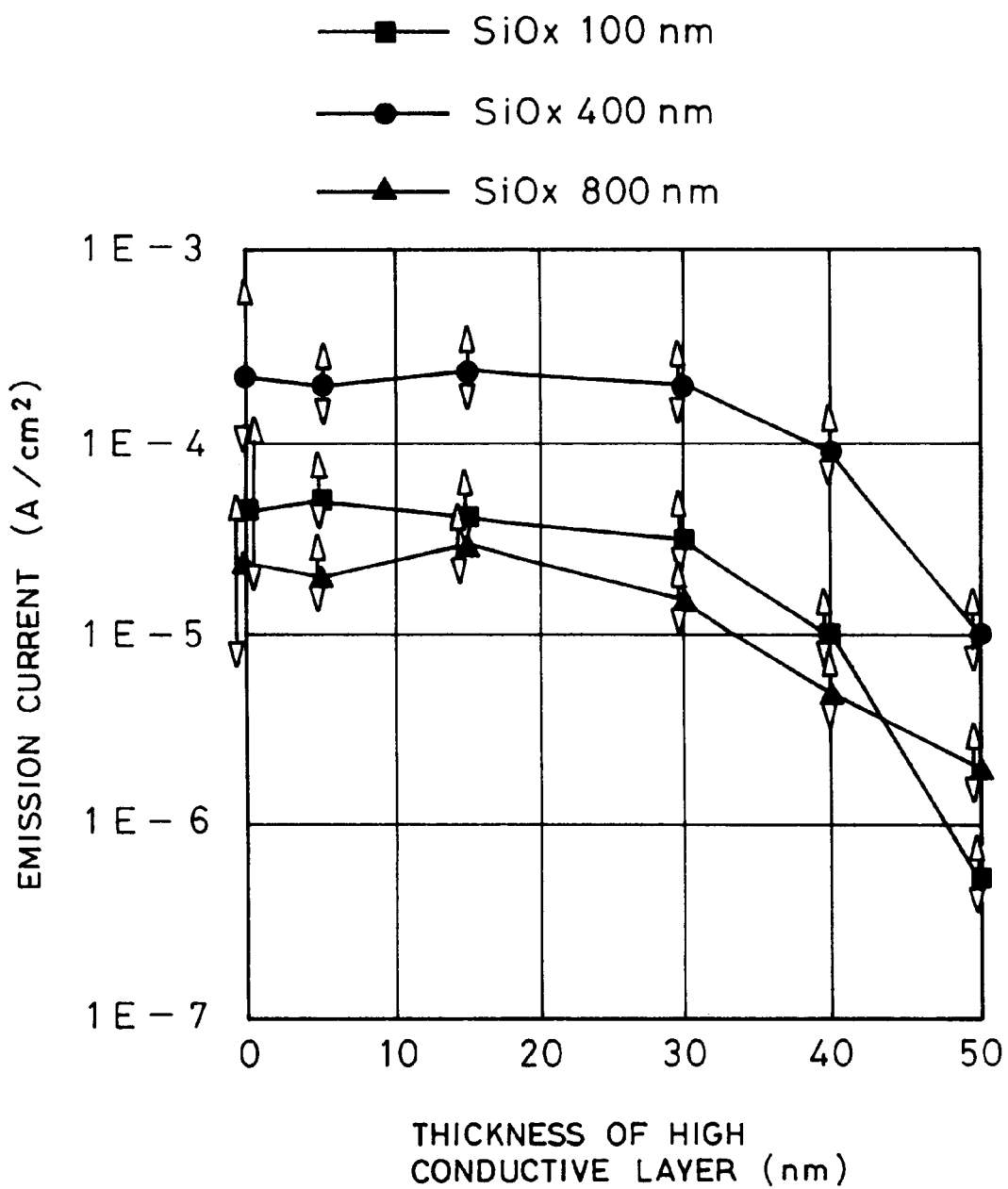
FIG. 2 is a graph illustrating a dependency of the emission current on the film thickness of field-stabilizing layer in an insulator layer of an electron emission device embodying the invention.

The results are shown in FIG. 2 which illustrates the variations of the emission current Ie with respect to the thickness of the field-stabilizing layer correspondingly to the thicknesses of the insulator layer 100 nm, 400 nm, and 800 nm. As apparent from Figure, it is understood that by applying a voltage of 200 V or lower, the emission current of $1 \times 10^{-6}$ A/cm$^2$ or greater can or greater can be acquired from an electron emission device comprising a set of the insulator layers and the high conductance layer having the total thickness of 50 nm or greater, preferably from 100 to 800 nm in thickness, and the high conductance layer having 50 nm or less. It is understood that the good results are obtained from the device comprising the electron-supply layer having field-stabilizing layer and the insulator layer of $SiO_x$ dielectric with a 50 nm thickness or greater preferably 100 nm thickness or greater.

With a voltage of approximately 4 kV applied between the fluorescent-substance coated collector electrode and the thin-film metal electrode of one embodiment of the above devices whose insulator layers have thicknesses of 50 nm or greater, a uniform fluorescent pattern corresponding to the shape of the thin-film metal electrode was observed. This indicates that the electron emission from the amorphous $SiO_x$ layer is uniform and has a high linear movement, and that those devices can serve as an electron emission diode, or a light-emitting diode or a laser diode which emits electromagnetic waves with millimeter or sub-millimeter wavelength and also a high speed switching device.

By a scanning electron microscope (SEM), there were observations of the surface of the $SiO_x$ insulator layer resulted from the sputtering during the above deposition process, microstructures composed of grain surface each having about 20 nm diameter appeared. The microstructures composed of grain structure of $SiO_x$ of the insulator layer seems to cause the peculiar phenomena that the tunnel current flows through the insulator layer which has a thickness of 50 nm or greater. While $SiO_x$ is an insulator by nature, multiple bands with low potentials are caused by the occurrence of defects adjacent thereto or impurities in the forbidden band of the insulator layer. It is assumed that electrons tunnel-pass through multiple bands with the low-potential one after another, and thus pass through the insulator layer of 50 nm or greater in thickness as a consequence.

Figure 3:
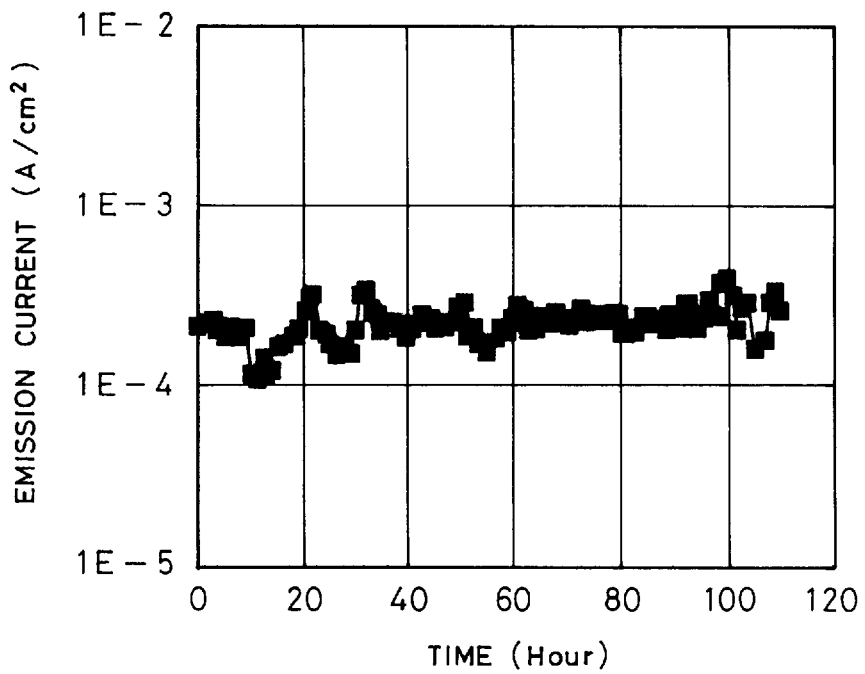
FIG. 3 is a graph illustrating fluctuations of emission current with the lapse of time in the electron emission device of the embodiment of the invention.
Figure 4:
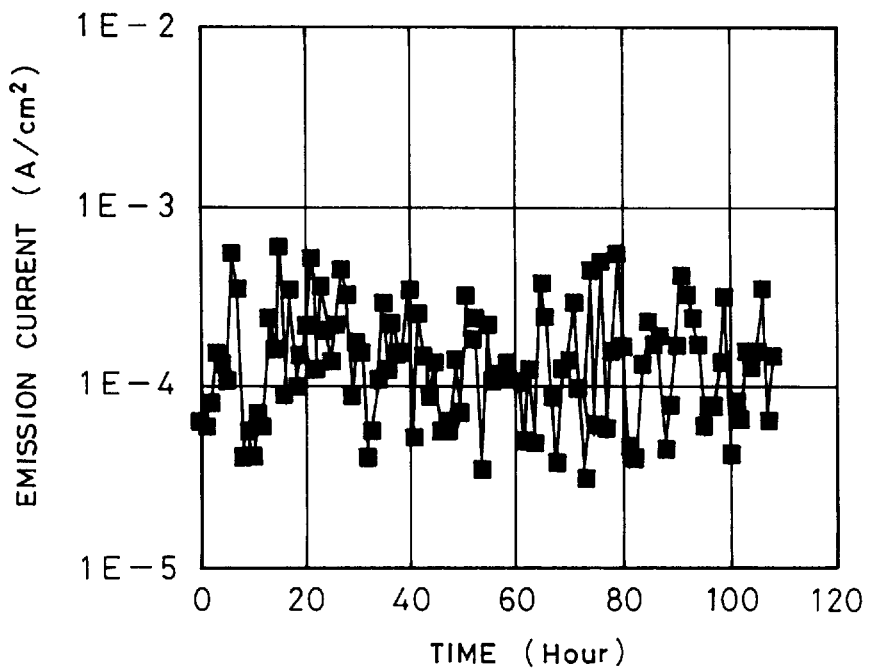
FIG. 4 is a graph illustrating fluctuations of emission current with the lapse of time in the electron emission device of the comparative electron emission device.

Moreover, there were measured fluctuations of the emission current Ie of the electron emission device both of the embodiment with the high conductance layer and the comparative without the high conductance layer. FIG. 3 shows the fluctuation of emission current with the lapse of time in the electron emission device having a high conductance layer. FIG. 4 shows the same of the comparative electron emission device having no high conductance layer. As apparent from these Figures, the embodiment device having the high conductance layer has a restricted fluctuation of emission current in comparison with the comparative device to make the emission current Ie very stable. It is understood that the high conductance layer uniforms the electric field applied by the voltage Vd in the insulator layer, so that the set of the insulator layer and the high conductance layer transport many electrons from the electron-supply layer to the thin-film metal electrode in comparison with the comparative device without any high conductance layer. As a result, the emission current Ie of the device becomes very stable.

Figure 5:
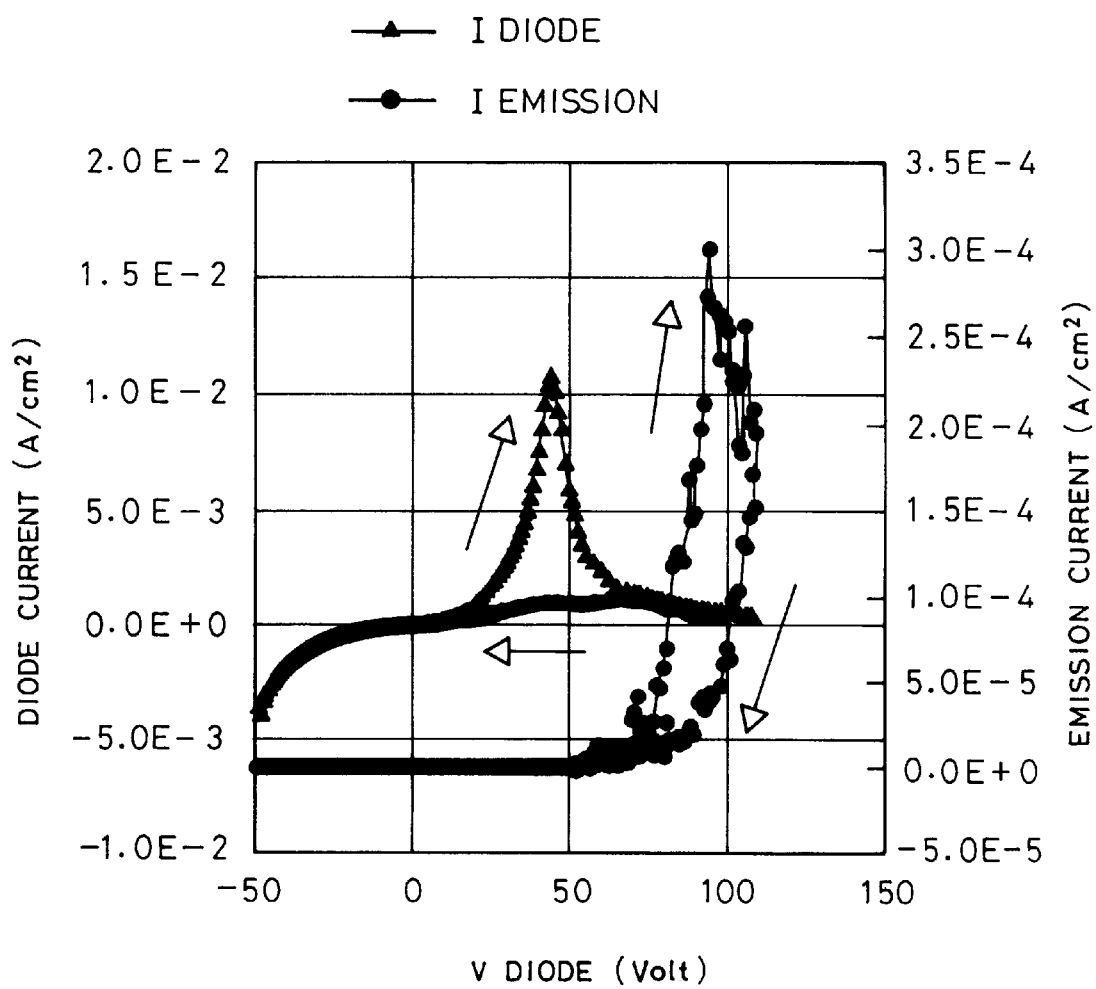
FIG. 5 is a graph illustrating a relationship of a Diode current Id and the Emission current Ie with respect to the Driving voltage Vd of the electron emission device of an embodiment according to the invention.

FIG. 5 shows a property relationship of a Diode current Id and the Emission current Ie with respect to the Driving voltage Vd of the electron emission device having the high conductance layer in the insulator layer. As seen from FIG. 5, it is understood that the diode current Id shows a hysteresis property. A voltage drop of diode current Id occurs at the starting point of the emission current Ie and then the emission current Ie rises.

Figure 6:
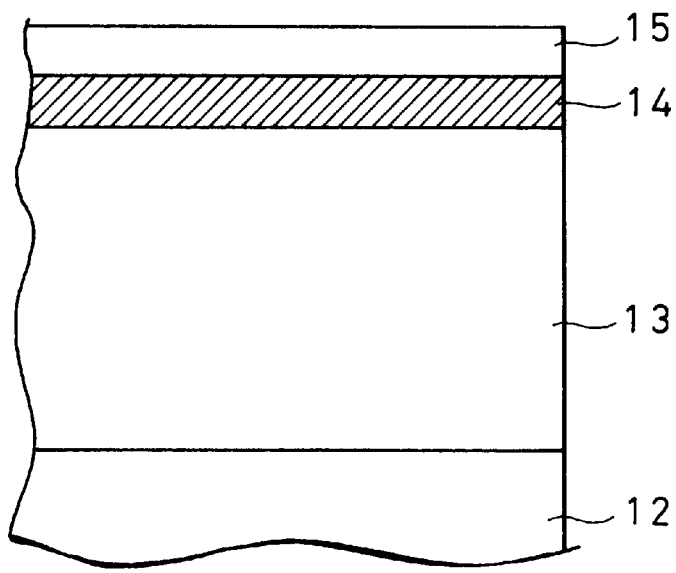
FIGS. 6 to 10 are partially enlarged cross-sectional views each showing an electron emission device of another embodiment according to the invention showing an adjacent region of the field-stabilizing layer.
Figure 7:
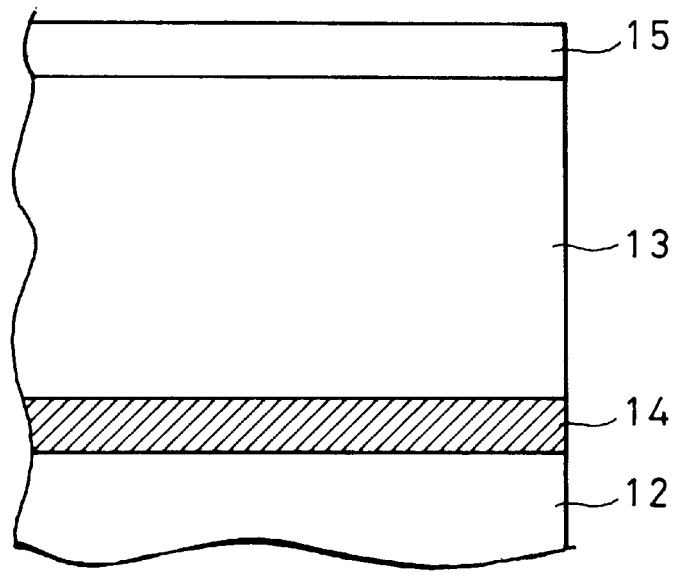

In addition that two of the field-stabilizing layers are disposed at an mediate region of the electron-supply layer as shown in the above embodiments, as shown in FIG. 6, a field-stabilizing layers 14 may be disposed at an interface between the insulator layer 13 and the thin-film metal electrode 15. As shown in FIG. 7, a field-stabilizing layers 14 may be disposed at an interface between the insulator layer 13 and the electron-supply layer 12.

Figure 8:
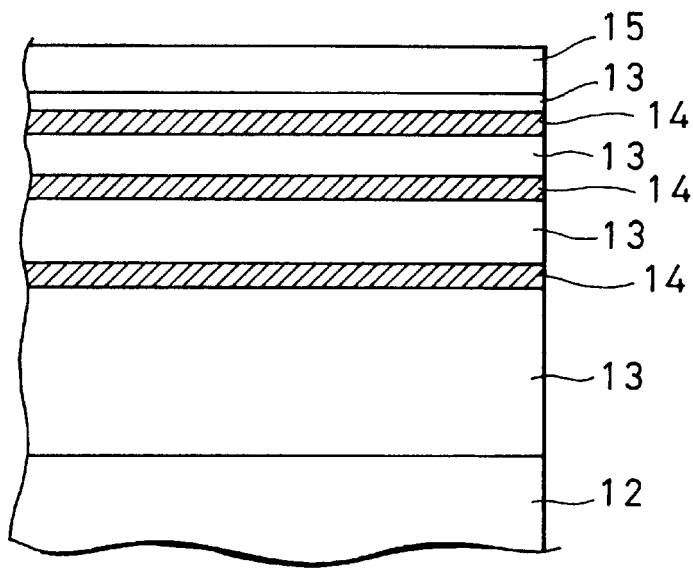

Further, as shown in FIG. 8 illustrating a partially enlarged cross section view of the device, two or more of the field-stabilizing layers 14 may be disposed within the insulator layer 13 to be divided into three portions or more as a multi-layered structure. In other words, a plurality of the field-stabilizing layer and the insulator layer are alternately layered by in the thickness direction of the device. In addition, a plurality of layered field-stabilizing layers 14 may be formed so as to have their interval gradually descended (or ascended) in the thickness direction upward.

Figure 9:
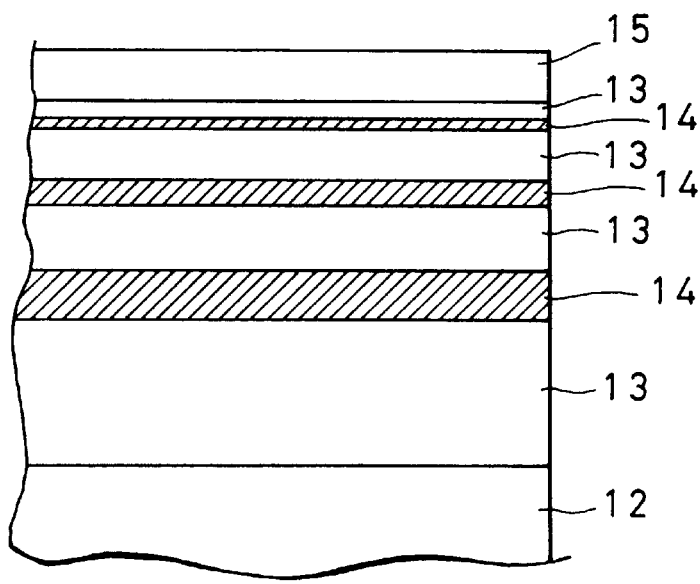

As shown in FIG. 9, a plurality of layered field-stabilizing layers 14 may be formed within the insulator layer 13 so as to have their thicknesses gradually descended (or ascended) in the thickness direction upward.

Figure 10:
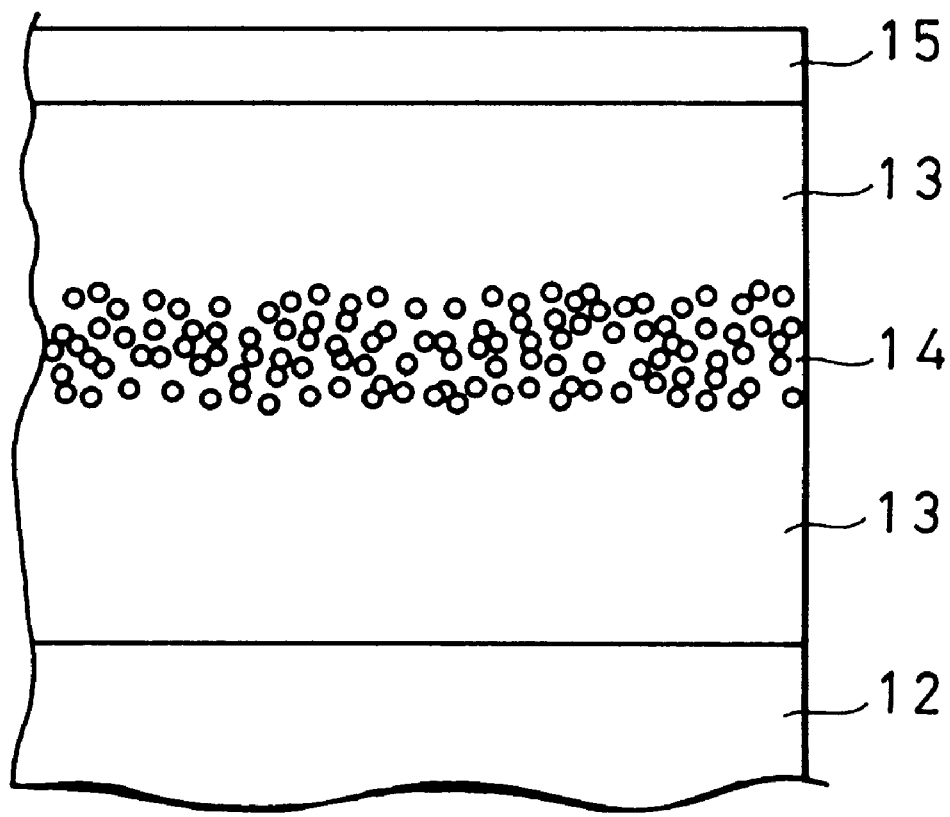

Sill further other embodiments are shown in FIG. 10 in which the field-stabilizing layer 14 may be formed, by sputtering, within the insulator layer 13 so as to be a dispersion region of dopants of a high conductive material. This high conductive region also can serve to facilitate to promote the transport of electrons from the insulator layer 13 to thin-film metal electrode 15. In addition, the high conductive region 14 may be formed to have a incline density of doptants so that as the higher or lower density of high conductive dopants is provided as the high conductive region 14 is closer to the thin-film metal electrode 15.

It is understood from those results that the insulator layer having field-stabilizing layer is effective for the electron emission device capable of driving in a stable emission current with a low applied voltage comprising; the electron-supply layer made of metal or semiconductor; the insulator layer with a 50 nm thickness or greater; and the thin-film metal electrode facing a vacuum space, so that the electron emission device emits electrons when applying a voltage across the electron-supply layer and the thin-film metal electrode.

Figure 11:
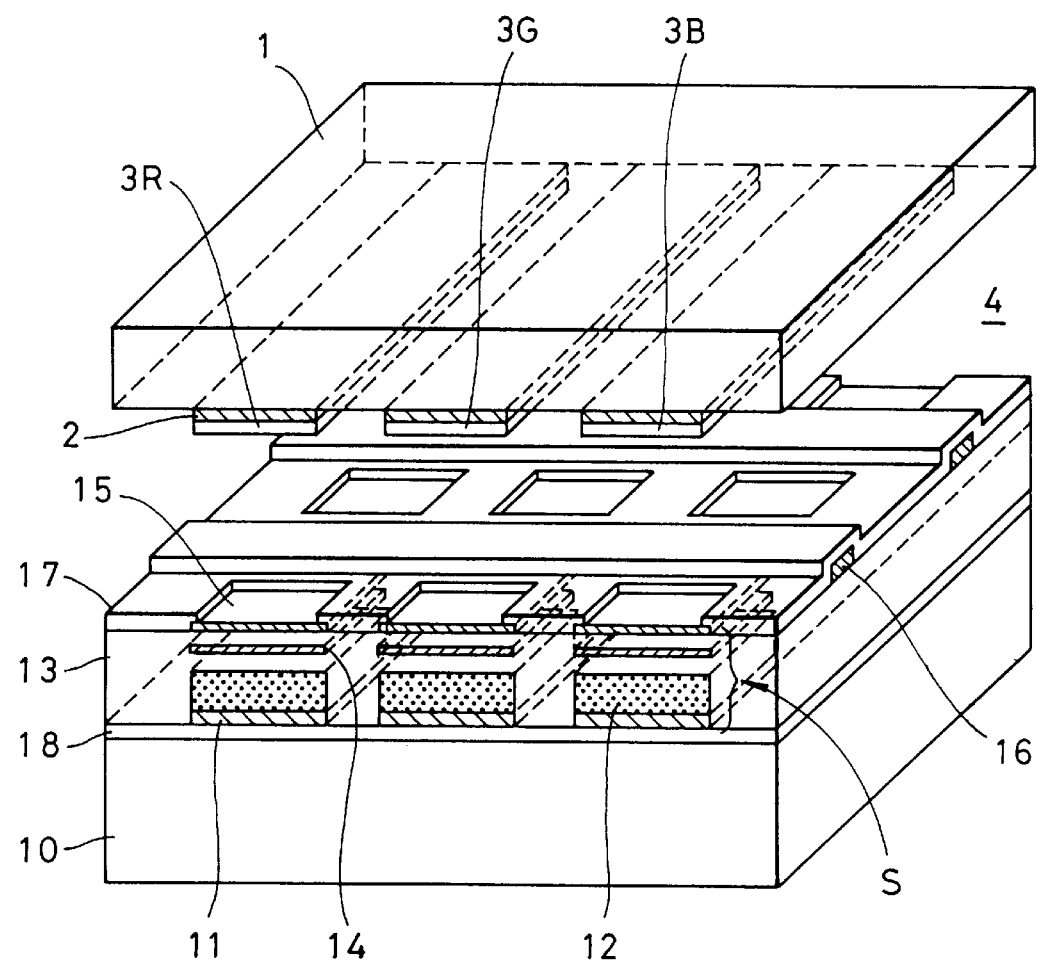
FIG. 11 is a schematic perspective view showing an electron emission display device according to one embodiment of the invention.

FIG. 11 shows an electron emission display device according to one embodiment of the invention. This embodiment comprises a pair of the transparent substrate 1 and the device substrate 10, which face each other with a vacuum space 4 in between. In the illustrated electron emission display apparatus, a plurality of transparent collector electrodes 2 of, for example, an indium tin oxide (so-called ITO), tin oxide (SnO), zinc oxide (ZnO) or the like, are formed in parallel on the inner surface of the transparent glass substrate 1 or the display surface (which faces the back substrate 10). The collector electrodes 2 may be formed integrally. The transparent collector electrodes which trap emitted electrons are arranged in groups of three in association with red (R), green (G) and blue (B) color signals in order to provide a color display panel, and voltages are applied to those three collector electrodes respectively. Therefore, fluorescent layers 3R, 3G and 3B of fluorescent substances corresponding to R, G and B color emissions are respectively formed on the three collector electrodes 2 in such a way as to face the vacuum space 4.

A plurality of ohmic electrodes 11 are formed in parallel on the inner surface of the device substrate 10 of glass or the like which faces the transparent glass substrate 1 with the vacuum space 4 in between (i.e., said inner surface faces the transparent glass substrate 1) via an auxiliary insulator layer 18. The auxiliary insulator layer 18 is comprised of an insulator such as $SiO_2$, $SiN_2$, $Al_2O_3$ or AlN, and serves to prevent an adverse influence of the device substrate 10 on the device (such as elution of an impurity such as an alkaline component or a roughened substrate surface). A plurality of electron emission devices S are formed on the ohmic electrodes 11. In order that adjoining thin-film metal electrodes 15 are electrically connected to each other, a plurality of bus electrodes 16 are formed on parts of the thin-film metal electrodes 15, extending in parallel to one another and perpendicular to the ohmic electrodes 11. Each electron emission device S comprises the electron-supply layer 12, the insulator layer 13 having the field-stabilizing layer 14, and the thin-film metal electrode 15 which are formed in order on the associated ohmic electrode 11. The thin-film metal electrodes 15 face the vacuum space 4. A second auxiliary insulator layer 17 with openings is formed to separate the surfaces of the thin-film metal electrodes 15 into a plurality of electron emission regions. This second auxiliary insulator layer 17 covers the bus electrodes 16 to prevent unnecessary short-circuiting.

The material for the ohmic electrodes 11 is Au, Pt, Al, W or the like which is generally used for the wires of an IC, and has a uniform thickness for supplying substantially the same current to the individual devices.

From the principle of electron emission, it is better that the material for the thin-film metal electrode 15 has a lower work function ø and is thinner. To increase the electron emission efficiency, the material for the thin-film metal electrode 15 should be a metal of the group I or group II in the periodic table; for example, Mg, Ba, Ca, Cs, Rb, Li, Sr, and the like are effective and alloys of those elements may be used as well. To make the thin-film metal electrode 15 very thin, the material for the thin-film metal electrode 15 should be chemically stable with a high conductivity; for example, single substances of Au, Pt, Lu, Ag and Cu or alloys thereof are desirable. It is effective to coat or dope a metal with a low work function as described above on or in those metals.

The material for the bus electrodes 16 can be Au, Pt, Al or the like which is generally used for the wiring of an integrated circuit IC, and should have a thickness enough to supply substantially the same potential to the individual devices, adequately of 0.1 to 50 μm.

A simple matrix system or an active matrix system may be employed as the driving system for the display device of the invention.

What is claimed is:

1. An electron emission device comprising:
    an electron-supply layer made of metal or semiconductor;
    an insulator layer formed on the electron-supply layer;
    a thin-film metal electrode formed on the insulator layer and facing a vacuum space, and
    at least one field-stabilizing layer layered on the insulator layer in a thickness direction thereof and having a conductivity higher than that of said insulator layer, whereby the electron emission device emits electrons when an electric field is applied between the electron-supply layer and the thin-film metal.

2. An electron emission device according to claim 1, wherein said field-stabilizing layer is disposed at an interface between the thin-film metal electrode and the insulator layer.

3. An electron emission device according to claim 1, wherein said field-stabilizing layer is disposed at an interface between the insulator layer and the electron-supply layer.

4. An electron emission device according to claim 1, wherein said field-stabilizing layer is disposed at a mediate region of said insulator layer.

5. An electron emission device according to claim 1, wherein a plurality of the field-stabilizing layers and the insulator layer are alternately layered in the thickness direction.

6. An electron emission device according to claim 5, wherein the plurality of said layered field-stabilizing layers have thicknesses gradually descended in the thickness direction.

7. An electron emission device according to claim 5, wherein the plurality of said layered field-stabilizing layers have thickness gradually ascended in the thickness direction.

8. An election emission display device comprises:
    a pair of first and second substrates facing each other with a vacuum space in between;
    a plurality of electron emission devices provided on the first substrate;
    a collector electrode provided in the second substrate;
    a fluorescent layer formed on the collector electrode, each of the electron emission devices comprising an electron-supply layer of metal or semiconductor;
    an insulator layer formed on the electron-supply layer;
    a thin-film metal electrode formed on the insulator layer and facing the vacuum space, and
    at least one field-stabilizing layer layered on the insulator layer in a thickness direction thereof and having a conductivity higher than that of said insulator layer.

9. An electron emission display device according to claim 8, wherein said field-stabilizing layer is disposed at an interface between the thin-film metal electrode and the insulator layer.

10. An electron emission display device according to claim 8, wherein said field-stabilizing layer is disposed at an interface between the insulator layer and the electron-supply layer.

11. An electron emission display device according to claim 8, wherein said field-stabilizing layer is disposed at an mediate region of said insulator layer.

12. An electron emission display device according to claim 8, wherein a plurality of the field-stabilizing layers and the insulator layer are alternately layered by in the thickness direction.

13. An electron emission display device according to claim 12, wherein the plurality of said layered field-stabilizing layers have thicknesses gradually descended in the thickness direction.

14. An election emission display device according to claim 12, wherein the plurality of said layered field-stabilizing layers have thicknesses gradually ascended in the thickness direction.

* * * * *